US006813545B2

(12) United States Patent
Stromme

(10) Patent No.: US 6,813,545 B2
(45) Date of Patent: Nov. 2, 2004

(54) AUTOMATIC TRAFFIC SIGN RECOGNITION

(75) Inventor: Oyvind Stromme, Oslo (NO)

(73) Assignee: Accenture Global Services GmbH, Schaffhausen (CH)

(*) Notice: Subject to any disclaimer, the term of this patent is extended or adjusted under 35 U.S.C. 154(b) by 0 days.

(21) Appl. No.: 10/615,091

(22) Filed: Jul. 7, 2003

(65) Prior Publication Data

US 2004/0010352 A1 Jan. 15, 2004

(30) Foreign Application Priority Data

Jul. 9, 2002 (EP) .............................................. 02354106

(51) Int. Cl.[7] ................................................ G06K 9/00
(52) U.S. Cl. ...................... 701/1; 340/425.5; 348/119; 348/148; 382/104; 358/107
(58) Field of Search ............... 701/1; 340/425.5, 340/457, 435, 933, 905; 348/148, 143, 119; 382/103, 104; 358/107

(56) References Cited

U.S. PATENT DOCUMENTS

| | | | | |
|---|---|---|---|---|
| 5,073,819 A | * | 12/1991 | Gates et al. | 348/140 |
| 5,864,305 A | * | 1/1999 | Rosenquist | 340/905 |
| 6,594,600 B1 | * | 7/2003 | Arnoul et al. | 702/94 |
| 2002/0080998 A1 | * | 6/2002 | Matsukawa et al. | 382/103 |
| 2003/0202683 A1 | * | 10/2003 | Ma et al. | 382/104 |

FOREIGN PATENT DOCUMENTS

| | | | | |
|---|---|---|---|---|
| CA | 1338425 C | * | 7/1996 | ............ G09F/7/00 |
| DE | 36 19824 A1 | | 12/1987 | |
| DE | 296 10677 U1 | | 10/1996 | |
| DE | 29618152 U1 | * | 2/1997 | ............ B60Q/1/50 |
| DE | 198 29162 A1 | | 1/2000 | |
| DE | 100 53315 A1 | | 5/2002 | |
| EP | 1 028387 A2 | | 8/2000 | |
| WO | WO 99/10195 | | 3/1999 | |

OTHER PUBLICATIONS

J. A. Janet et al., "Pattern Anallysis for Autonomous Vehicles with the Region–and Feature–based Neural Network: Global Self–Localization and Traffic Sign Recognition", Proc. of the 1996 IEEE Int. Conference on Robotics and Automation Minneapolis Minnesota–Apr. 1996, pp. 3598–3604.

J. Canny, "A Computational Approach to Edge Detection", IEEE Transactions on Pattern Analysis and Machine Intelligence, vol. 8, No. 6, Nov. 1986, pp. 679–698.

* cited by examiner

Primary Examiner—Thomas G. Black
Assistant Examiner—Tuan C To
(74) Attorney, Agent, or Firm—Morrison & Foerster LLP

(57) ABSTRACT

The invention concerns a system for reminding a driver of the presence of at least one particular traffic sign, comprising: an imaging unit (1) attached to the vehicle and directed towards the road ahead of the vehicle; a database (3) containing at least one pre-registered shape of traffic sign; an automatic recognition unit (2) for detecting and identifying, in successive images, a traffic sign by searching image areas having a shape contained in said database; and a sound (5) and/or visual (4) indicator of an identified traffic sign.

5 Claims, 2 Drawing Sheets

AUTOMATIC TRAFFIC SIGN RECOGNITION

This application claims the priority benefit of European Patent Application Serial No. 02354106.3, filed Jul. 9, 2002, titled "AUTOMATIC TRAFFIC SIGN RECOGNITION."

FIELD OF THE INVENTION

The present invention generally concerns an assistance system for a driver of a vehicle, and more particularly a system for reminding the driver of the presence of at least some specific traffic signs on the way.

BACKGROUND OF THE INVENTION

Today, drivers are already helped by automatic systems among which localization systems (GPS).

However, although a GPS system can be updated in view of the modifications of the roads, it does not include exhaustive information about the traffic signalization. The main reason is that traffic signalization may change without notice to cartographic organisms. Also, a road worker can modify the traffic signalization.

It would be useful to signal to a driver at least some important traffic signs. This could avoid accidents due to driver's negligence.

The present invention aims at providing such an automatic traffic sign recognition system on a vehicle to remind a driver of the presence of some traffic signs on the road.

Another purpose of the invention is to provide a system that recognizes traffic signs even if some of them are illegible.

There is a technical problem in detecting the presence of traffic signs on the road and, more particularly, in distinguishing two successive traffic signs present on the same road. Indeed, all the traffic signs do not have the same size and a larger traffic sign seen by the driver is not necessarily the first traffic sign encountered along his way.

SUMMARY OF THE INVENTION

To attain these purposes and others, the present invention provides a system for reminding a driver of a vehicle the presence of a particular traffic sign on the way comprising:

an imaging unit attached to the vehicle and directed towards the road in the front of the vehicle;

an automatic recognition unit of pre-registered traffic signs contained in a library; and a sound and/or visual indicator of an identified traffic sign present on the road ahead of the vehicle.

According to the present invention, the system takes periodical pictures of the road ahead of the vehicle. The periodicity of the pictures preferably depends upon the speed of the vehicle.

In each country, the shapes of the traffic signs are standardized and various symbols can be marked on each sign. For example, in Europe, only the "stop" sign has an octagonal shape, and only the "give way" sign has the shape of an inverted triangle.

So, each picture is analyzed in a shape recognition processor to detect the eventual presence of shapes looking like traffic sign shapes pre-registered in a database. This database or library may contain not only the shapes of the traffic signs, but also the symbols inside the traffic signs. So, the system is also able to distinguish different traffic signs having the same shape.

When the system detects the presence of traffic signs ahead of the vehicle, a sound and/or visual indicator provided inside the vehicle is actuated to remind the driver of the presence of traffic signs on the road. Then, the attention of the driver is stimulated.

According to an embodiment of the present invention, the system registers at least two successive images of the road to be able to distinguish the first coming traffic sign between two successive signs detected in a picture. For this purpose, the system compares the variation of the rectangular coordinates of a reference point of the sign picture in two successive images to determine the rank between two such analyzed signs. This can also be used to evaluate the distance separating the vehicle from the next traffic sign by combining the rectangular coordinate evaluation with the speed of the vehicle.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, among which.

Figure 1:
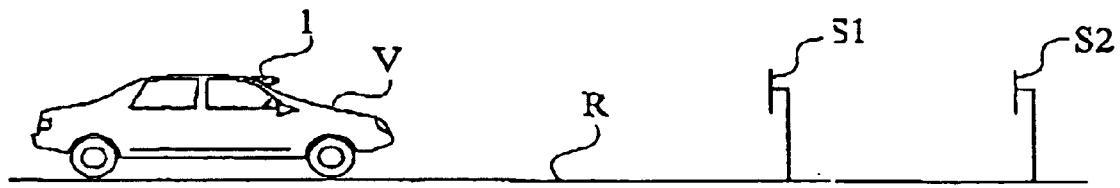
FIG. 1 schematically represents a road on which traffic signs are present.

For clarity, only the elements and steps useful to the understanding of the invention have been shown in the drawings and will be disclosed hereafter. More specifically, the programs and steps for implementing the invention by means of a computerized system will not be detailed, as it will readily occur to those skilled in the art.

FIG. 1 schematically represents a road R on the side of which are disposed two successive traffic signs S1, S2. The types of the signs S1 and S2 are not visible on the lateral view of FIG. 1. A vehicle V is driven along the road R and is equipped with a system according to an embodiment of the present invention. In FIG. 1, only one camera 1 for taking successive pictures of the area ahead of the vehicle is shown. For clarity, camera 1 has been represented external to vehicle V. Alternatively, camera 1 can be disposed inside of the vehicle V and directed to the outside through the windscreen, or hung anywhere on the car that enables a clear view ahead of it.

Figure 2:
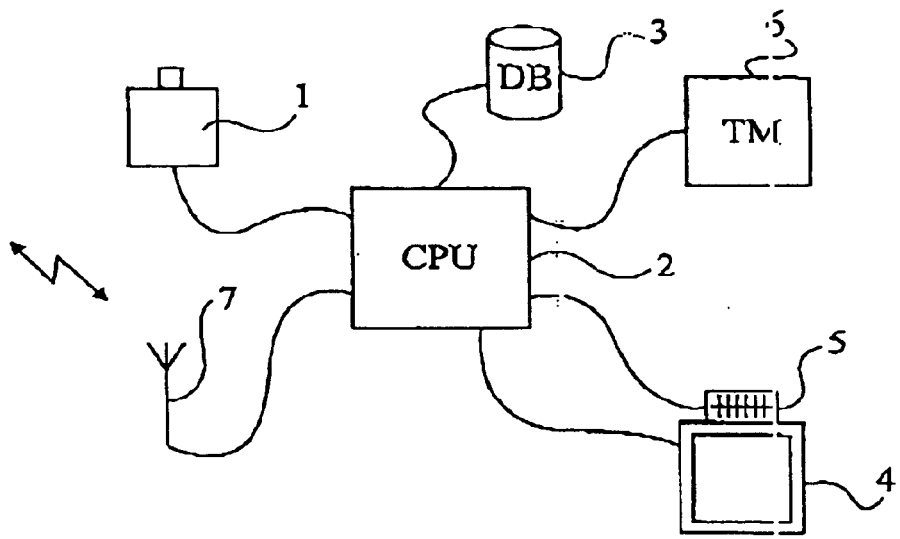
FIG. 2 illustrates an embodiment of a system of traffic sign recognition according to the present invention.

FIG. 2 illustrates an embodiment of the system according to the present invention. Camera 1 is linked to a central processing unit 2 (CPU) for processing and analyzing the successive pictures taken by camera 1. Unit 2 is also linked to an external memory (for example a database DB) 3 containing a library of pre-referenced traffic signs. Unit 2 also controls a screen 4 and/or a speaker 5.

According to a preferred embodiment of the present invention, unit 2 also takes into account the sensed speed of the vehicle. Therefore, unit 2 is linked to a tachymeter (TM) 6, sensing the speed of the vehicle V.

Additionally, the system of the present invention can take into account the location of the vehicle on a computerized map. Therefore, the system is combined with localization means, for example a GPS system. For this purpose, unit 2 is linked to an antenna 7 for communicating with localization satellites.

Figure 3:
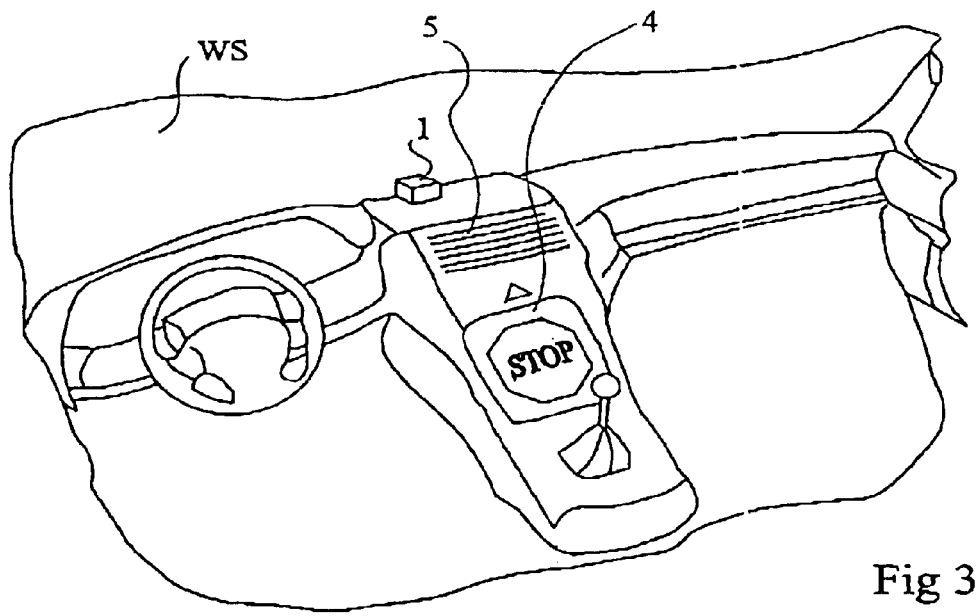
FIG. 3 represents partially and schematically an inboard cabin of a vehicle according to an embodiment of the present invention.

FIG. 3 represents the front of the cabin of a vehicle. A screen 4 is arranged to be seen by the driver and a speaker 5 is provided in the dashboard. These two elements can be shared by other systems like, for example, the radio system of the vehicle or a board computer of the vehicle.

In the embodiment of FIG. 3, camera 1 is disposed inside the vehicle behind the windscreen WS.

The central processing unit 2 and external or internal memories (especially database 3) are disposed, for example, inside the dashboard or at any other convenient place inside the vehicle.

Figure 4:
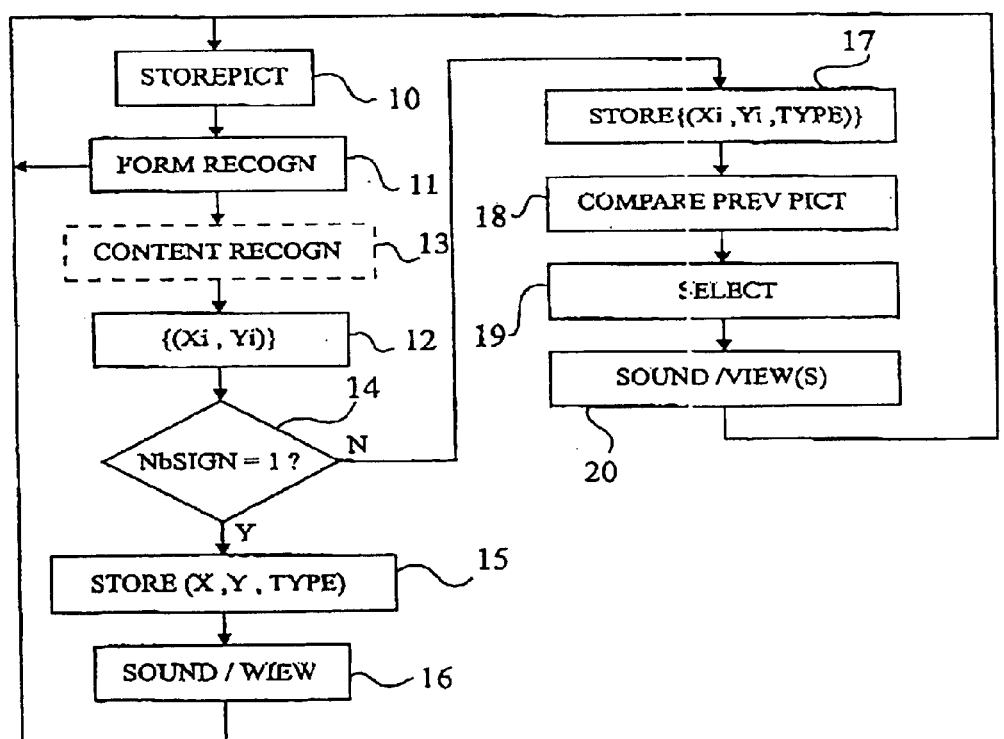
FIG. 4 is a flow chart illustrating the operation of a system according to an embodiment of the present invention.

FIG. 4 is a flow chart of an exemplary embodiment of operation of a system for reminding to a driver of a vehicle the presence of a particular traffic sign on the way, according to the invention.

FIG. 4 does not show the initialization steps of the operation method, which will appear to one skilled in the art after the following explanation. FIG. 4 only represents the flow chart of the analysis and communication loop of the operation method which is characteristic of the invention.

The first step 10 consists in storing a current picture taken by camera 1 ahead of the vehicle.

Then, according to the present invention, central processing unit 2 performs a shape recognition step 11 consisting in searching, in the digital picture, the presence of picture area having a shape corresponding to a pre-registered shape corresponding to a traffic sign.

Figure 5:
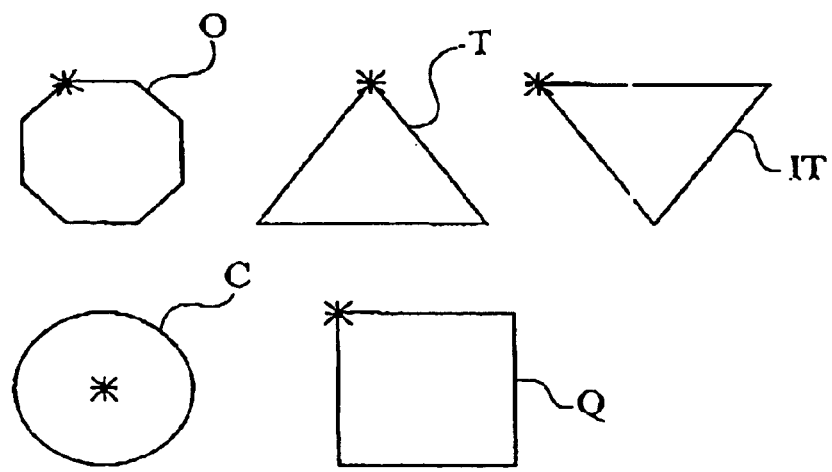
FIG. 5 illustrates traffic signs' shapes to be recognized by a system according to the present invention.

FIG. 5 illustrates the five most common shapes of traffic signs (at least in Europe). An octagonal sign O always corresponds to a "stop" sign. A triangular sign T is a "warning" sign. An inversed triangle IT always corresponds to a "give way" sign. A circular sign C is an "interdiction" or "authorization" sign. A square or rectangular sign Q is an "information" sign.

The five shapes illustrated in FIG. 5 correspond to the basic shapes to be searched according to a preferred embodiment of the present invention. These shapes are pre-registered not only in a front view but also in angular views, as the signs are most often disposed on the side of a road R (FIG. 1).

The shape search and recognition step 11 of the present invention uses conventional image processing methods.

To be able to identify some shapes and their orientation, the central processing unit 2 has to take into account the referential of camera 1 and the referential of road R.

An simple image processing method such as a simple edge detection mechanism could be used to implement the present invention. A Canny edge detector (J. Canny A Computational Approach to Edge Detection, IEEE Transactions on Pattern Analysis and Machine Intelligence, Vol. 8, No. 6, Nov. 1986.) followed by a simple pixel-by-pixel matching across the processed picture should be sufficient. Since several views of the sign shapes are stored no transformational processing should be necessary.

If no sign shape is detected, the system returns to step 10. If a sign shape is detected, the system registers at step 12 the rectangular coordinates $X_i$, $Y_i$ of a reference point of the shape. Such a reference point is predetermined and corresponds, for example and arbitrarily, respectively:

for an octagon, to the upper left angle;
for a triangle, to the upper corner;
for an inverted triangle, to the left angle;
for a circle, to the center; and
for a rectangle, to the upper left corner.

The reference points of the various shapes are identified by crosses in FIG. 5.

At least if the detected shape is a triangle, a circle or a rectangle, the system performs an additional step 13 to identify the symbol contained in the sign. Such an identification can be made by a pattern or recognition algorithm applied to the detected shape. Such pattern recognition is not necessary for the octagonal and inverted triangular signs, which respectively always indicate a "stop" or "give way".

Preferentially, a color detection is also carried out to check that a shape detected is effectively a traffic sign.

If only one sign is detected in the current picture (test 14, NbSIGN=1), the system stores (bloc 15) the rectangular coordinates X, Y and the type (identifiant) of the traffic sign. Then, an indication step 16 (SOUND/VIEW) consists in displaying the traffic sign on the screen 4 of the vehicle (for example, the sign "stop" in FIG. 3) and/or to convey the interpreted information to the driver through a speaker 5. Then, the system returns to step 10.

If more than one traffic sign is recognized and detected at step 14, the respective rectangular coordinates and type are stored (block 17: STORE{(Xi, Yi, TYPE)}).

According to a feature of the present invention, the system determines which traffic sign is the first one on the way of the vehicle. To obtain the rank of the traffic signs, the system performs (step 18, COMPARE PREV PICT) a comparison of the coordinates of the traffic signs in the current picture with respect to their coordinates in the previous picture. Various ways of selection (block 19, SELECT) can be implemented. For example, the system can use a threshold of distance with respect to the vehicle to stop informing the driver once the traffic sign is too close of the vehicle. Such a distance threshold is preferably also used even if only one sign is identified.

According to another example, the various traffic signs are indicated with their respective orders, either successively or simultaneously on the screen.

According to another embodiment that also applies when only one traffic sign is detected, the system of the invention is combined with GPS localization system and with the map of the area. Then, the traffic sign pictograms are displayed in the respective locations on the road representation on screen 4. Successive traffic signs are then simultaneously displayed.

According to the simplified embodiment illustrated by FIG. 4, the closer traffic sign is indicated (block 20, SOUND/VIEWS) to the driver. Then, the system takes the following picture and performs step 10 again.

The frequency of the pictures is predetermined or, according to a preferred embodiment, depends upon the speed of the vehicle. It is also possible to use the speed information to help in determining the relative locations of traffic signs appearing in successive pictures.

An advantage of the present invention is that symbol recognition is optional. Some traffic signs can be identified even if they contain illegible texts on the basis of their shape. Even if the sign corresponds to a triangle, a circle or a rectangular sign, the system can inform the driver of the class or type of the sign.

The practical implementation of the invention is in the ability of one with an ordinary skill in the art based on the functional description above.

Having thus described at least one illustrative embodiment of the invention, various alterations modifications and improvements will readily occur to those skilled in the art.

Such alteration, modification, and improvements are intended to be within the spirit and scope of the invention. Accordingly, the foregoing description is by way of example only and is not intended to be limiting. The invention is limited only as defined in the following claims and the equivalent thereto.

What is claimed is:

1. A system for reminding a driver of the presence of at least one particular traffic sign, comprising:

an imaging unit attached to the vehicle and directed towards the road ahead of the vehicle;

a database containing at least one pre-registered shape of traffic sign;

an automatic recognition unit for detecting and identifying, in successive images, traffic signs by searching image areas having a shape contained in said database, a selection between two signs identified in a same picture being performed by comparing the variation of the rectangular coordinates of a reference point of the signs in two successive pictures for evaluating the distance between the vehicle and the signs; and a sound and/or visual indicator of at least one identified traffic sign.

2. The system of claim 1, in which said automatic recognition unit also compares the colors of an identified shape with a set of stored color information.

3. The system of claim 1, in which said automatic recognition unit also compares the symbol included in an identified shape with a set of stored symbols.

4. The system of claim 1, in which said database contains, for each shape, various view angles.

5. The system of claim 1, in which the imaging unit is actuated at a frequency dependent upon the speed of the vehicle.

* * * * *